July 11, 1961  M. DE HAAS  2,991,892
AUTOMATIC FEED MEANS FOR MACHINE TOOLS
Filed Aug. 10, 1955  9 Sheets-Sheet 1
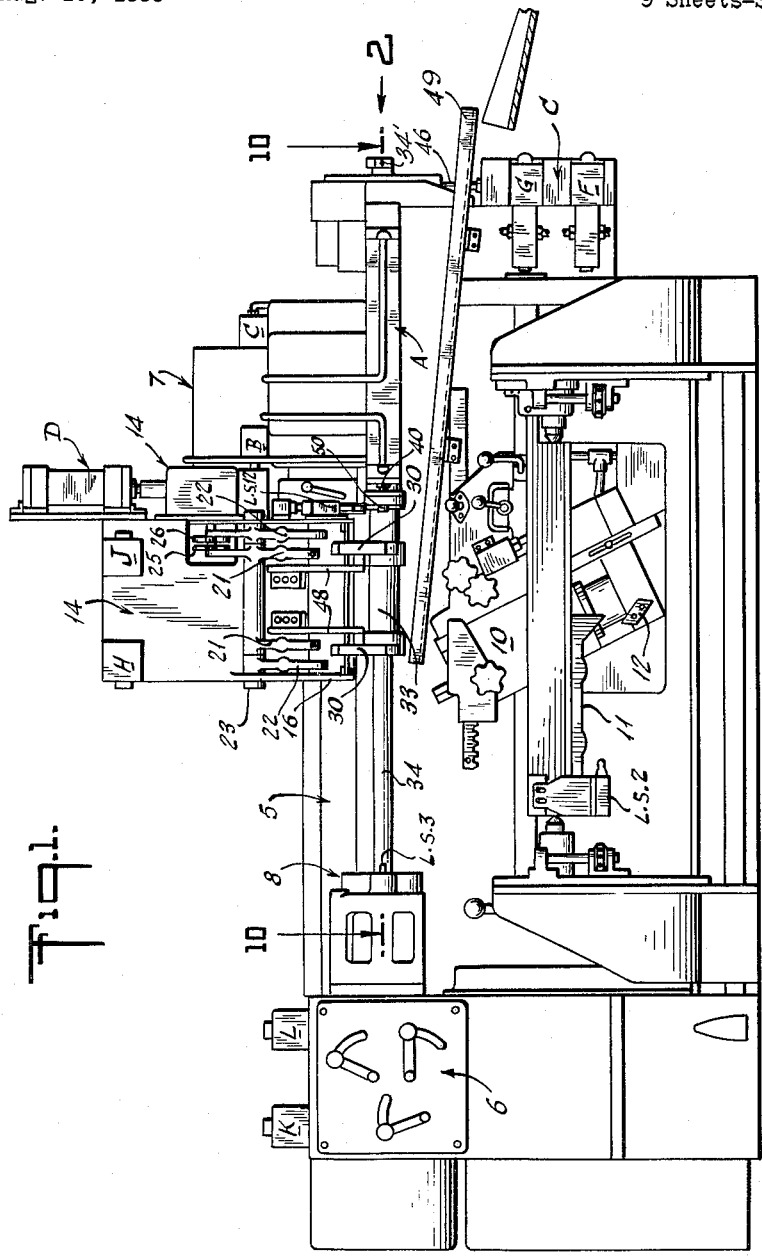
INVENTOR
MAX DE HAAS
BY
*Mitchell Berhert*
ATTORNEYS

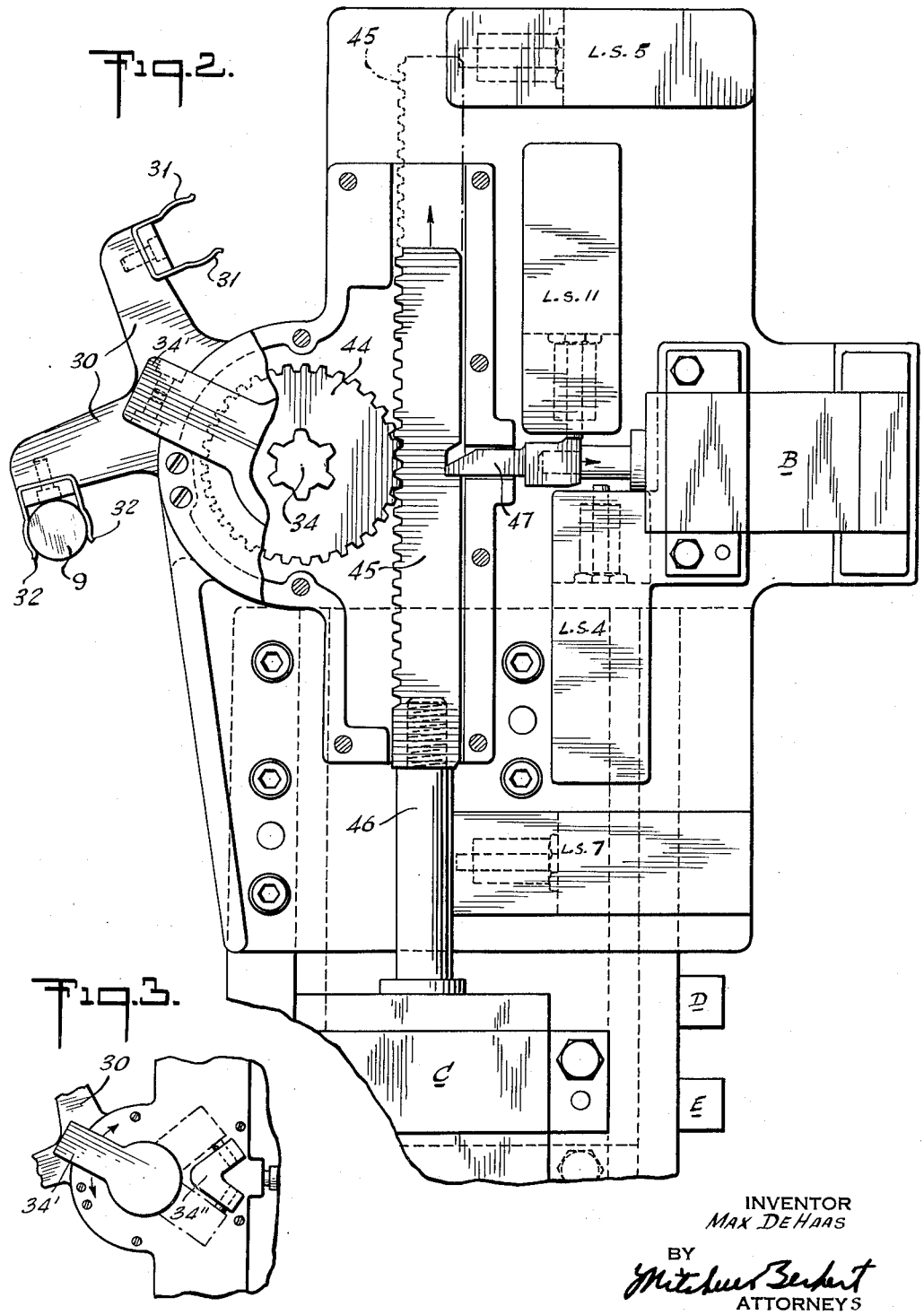

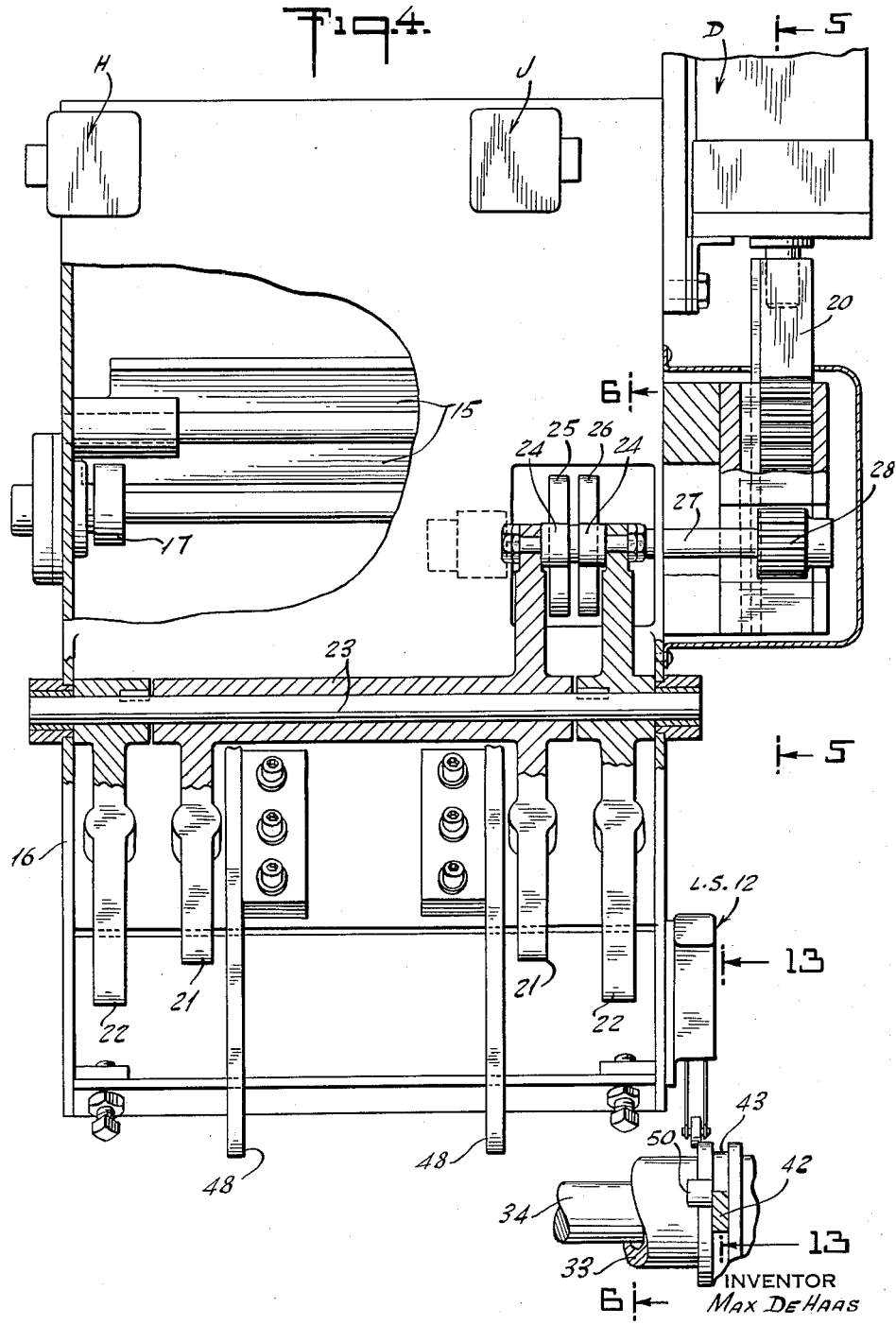

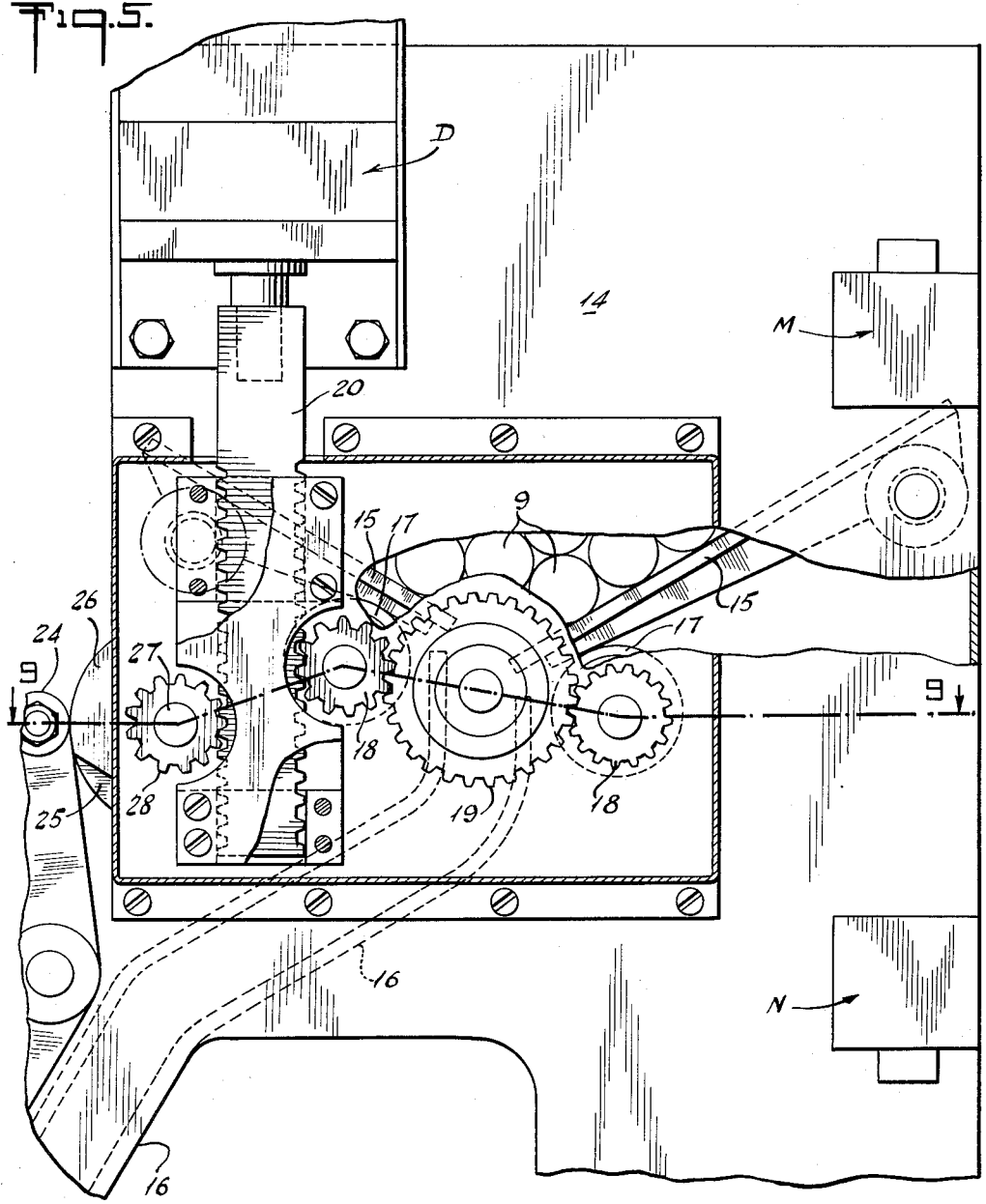

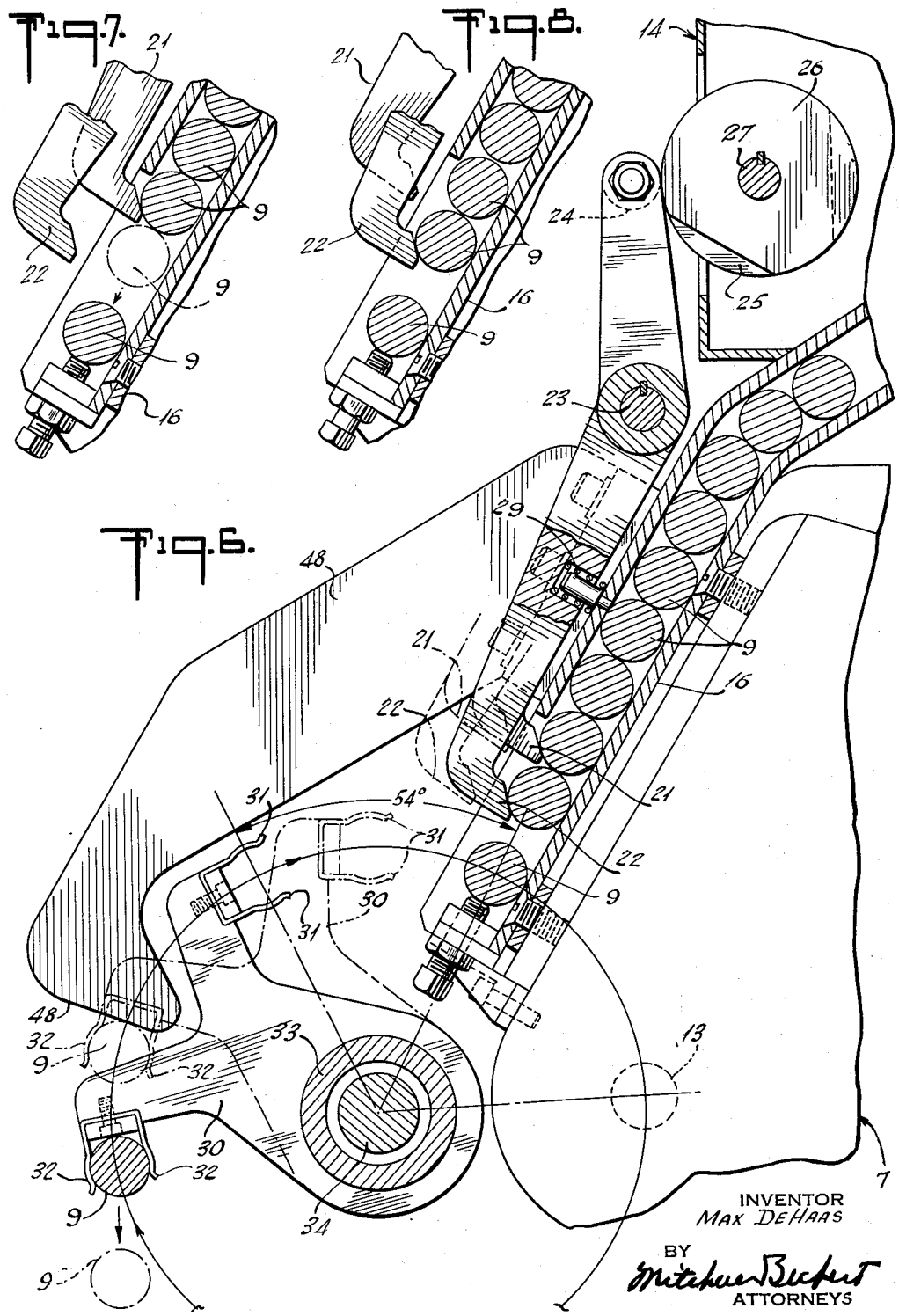

July 11, 1961  M. DE HAAS  2,991,892
AUTOMATIC FEED MEANS FOR MACHINE TOOLS
Filed Aug. 10, 1955  9 Sheets-Sheet 6
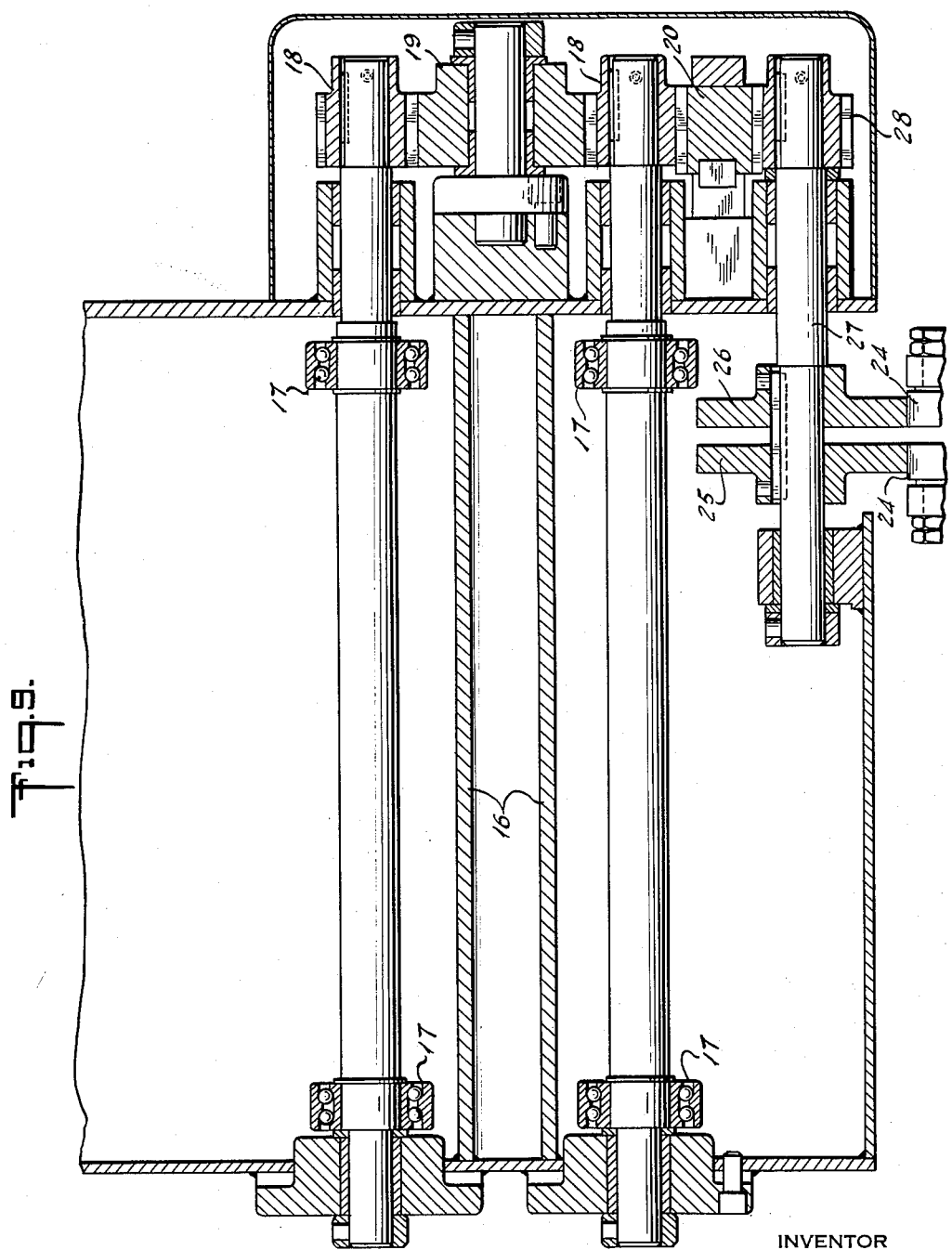
INVENTOR
Max De Haas
BY
Mitchell Bichert
ATTORNEY

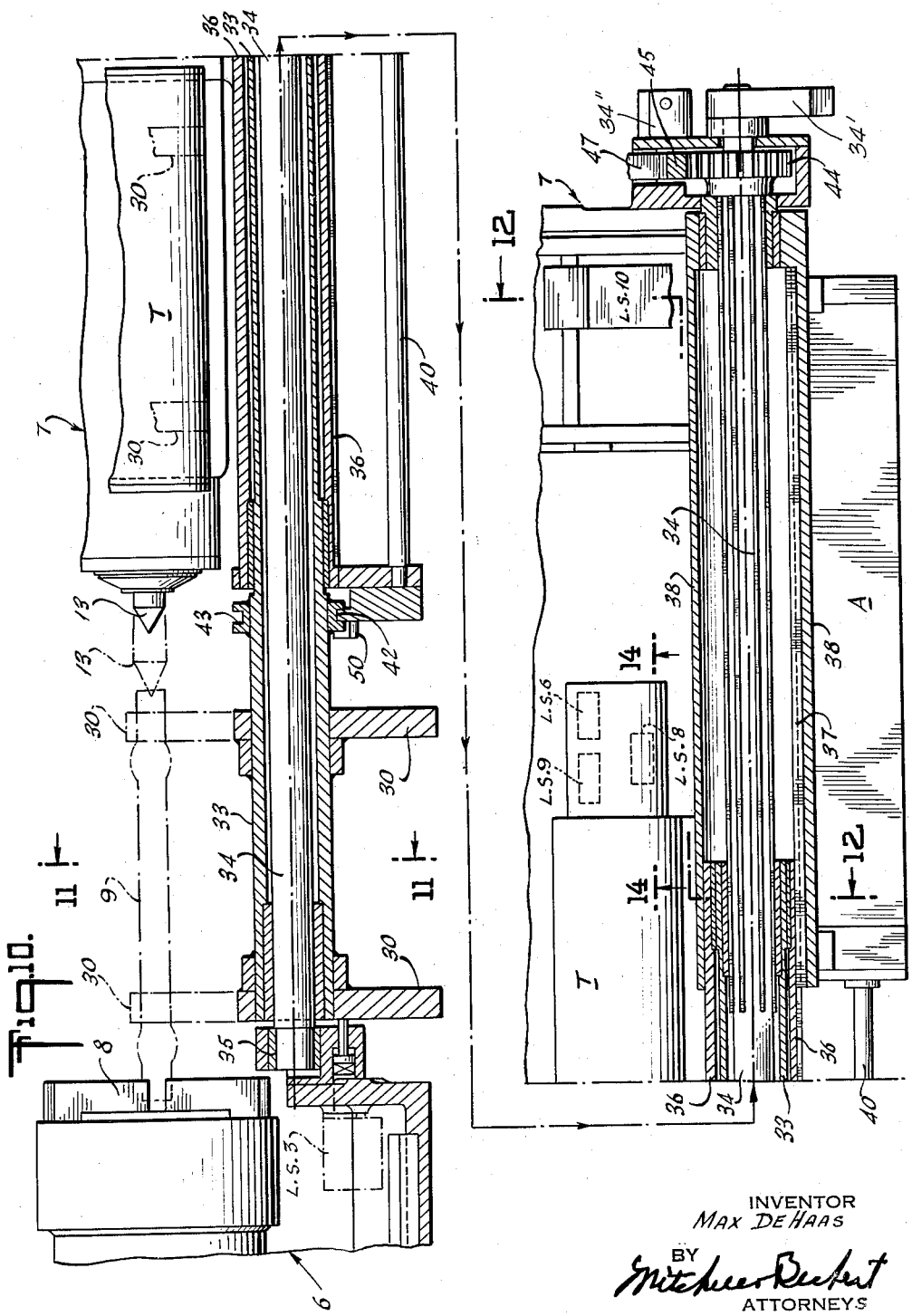

July 11, 1961  M. DE HAAS  2,991,892
AUTOMATIC FEED MEANS FOR MACHINE TOOLS
Filed Aug. 10, 1955  9 Sheets-Sheet 8
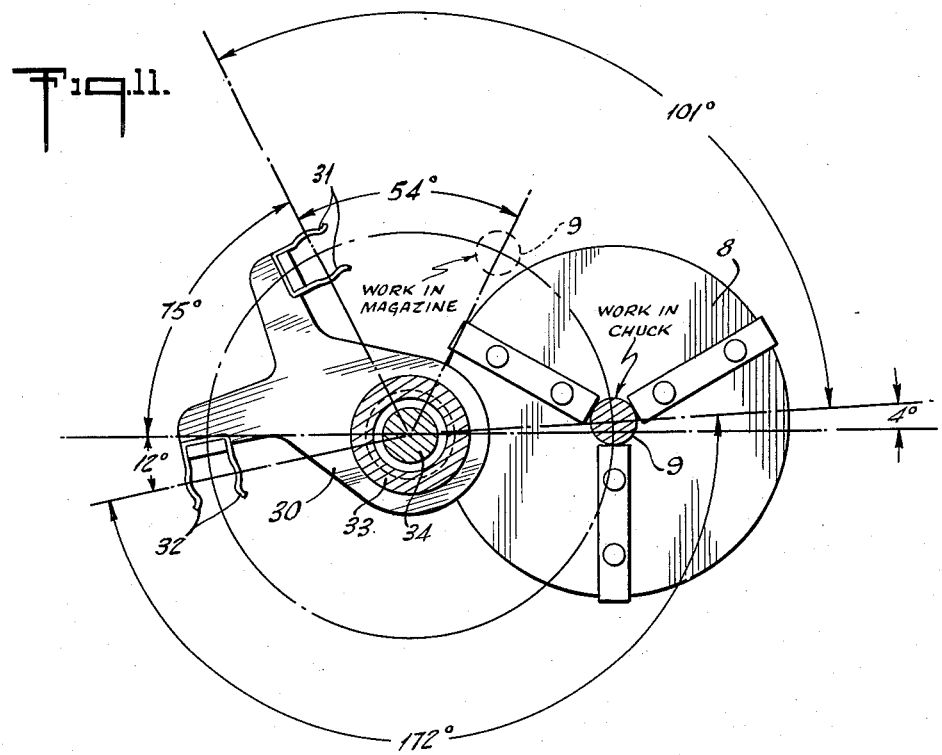
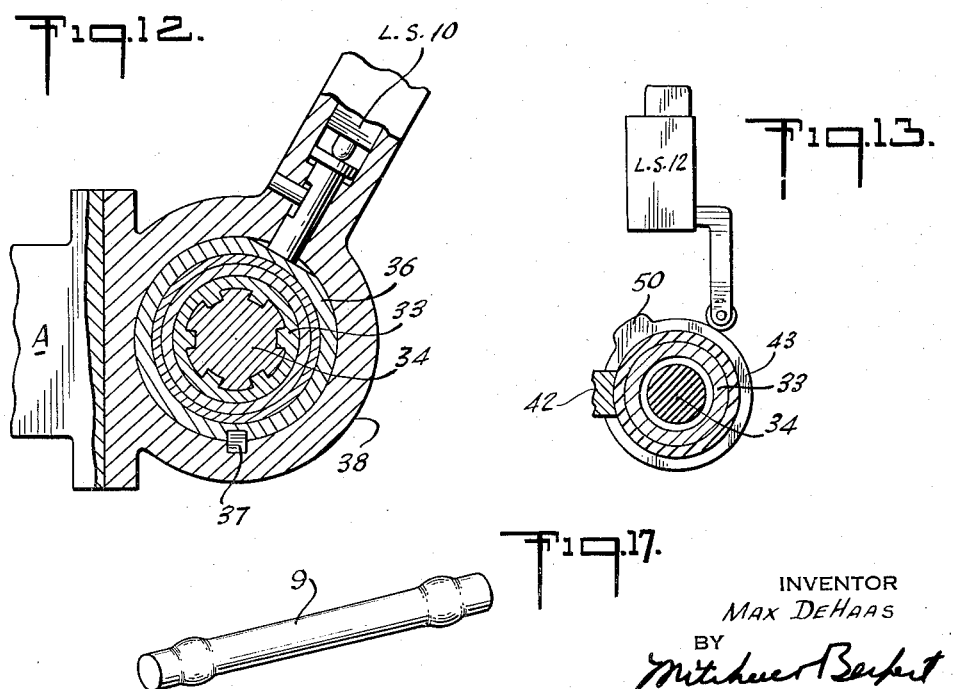
INVENTOR
MAX DE HAAS
BY
Mitchell Berkert
ATTORNEYS

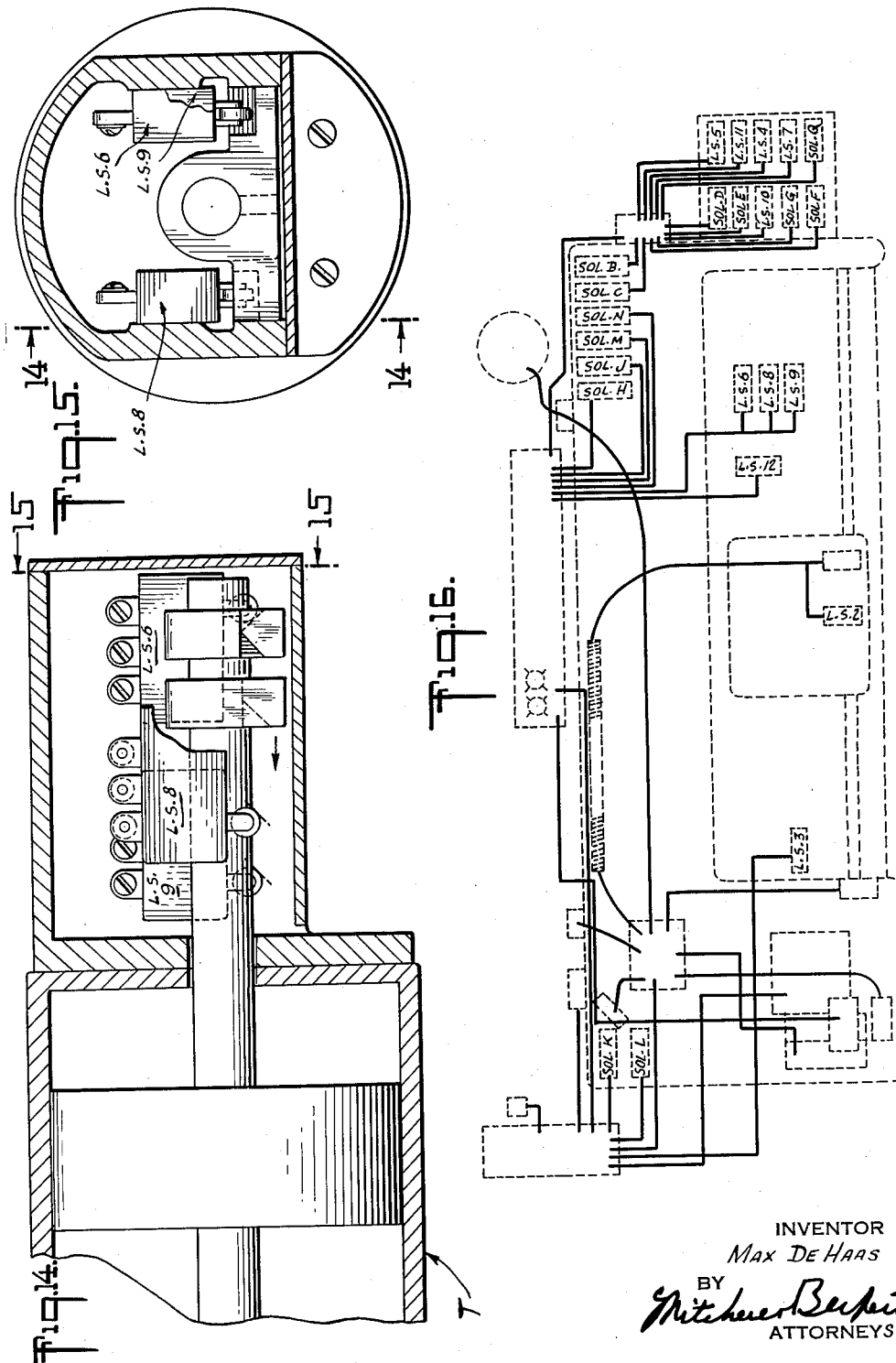

United States Patent Office 2,991,892
Patented July 11, 1961

2,991,892
AUTOMATIC FEED MEANS FOR MACHINE TOOLS
Max De Haas, West Hartford, Conn., assignor to The New Britain Machine Company, New Britain, Conn., a corporation of Connecticut
Filed Aug. 10, 1955, Ser. No. 527,494
7 Claims. (Cl. 214—1)

My invention relates to a machine tool and more particularly to a magazine feed means for such a tool.

In many magazine feed means now in use, the transfer mechanism for feeding new work pieces, or for picking off finished work pieces, normally stands in relatively close proximity to the working zones, and sometimes impairs the view of the operator and occasionally interferes with proper operation of the machine. Furthermore, many magazine feed arrangements in present use lack safeguards for preventing accidents or injury to the machine in case of improper functioning of the feed mechanism or other parts.

It is an object of my invention, therefore, to provide a magazine feed means, which is simple in construction and not likely to get in the way of the operator or any machine parts, and which is provided with safety mechanisms to guard against injury to the machine or the operator in case of improper functioning.

It is a more specific object to provide an improved magazine feed means arranged to pick up a new work piece, advance the same to the working zone, where the new work piece is deposited into a chuck or the like, and then the feed means is withdrawn to an out-of-the-way position, leaving the working zone free and open for the inspection of the operator.

It is another object to provide improved means for feeding the magazine feed means or transfer mechanism for easy, accurate feeding and placing of the new work and for picking up a finished work piece.

A further object is to provide an improved oscillating mechanism for the work feeding and pick-off mechanism, together with safety mechanism for preventing jamming or collision of any parts during the traverse or the oscillating movements of the stock-feed mechanism.

Another object is to provide a magazine having improved mechanism for feeding work pieces from the magazine to a chute and for depositing work pieces one at a time to be picked up by feed means.

Another object is to provide a magazine with improved means for feeding work pieces one at a time therefrom, together with improved means for agitating the magazine to prevent jamming of work pieces therein.

Another object is to provide a tail stock center with improved means for moving the latter for centering a work piece in a chuck and so arranged that, upon the absence of a work piece or the placing of an abnormally short work piece, the machine will shut down and avoid injury to the tail stock center or other parts by collision thereof with any of the feed mechanism.

It is another object to provide improved safety devices and interlocks to assure proper sequence of operations of the various magazine loading and machining functions to assure accuracy without injury to any of the machine parts.

Other objects and various features of novelty and invention will be pointed out or will become apparent.

The invention will be described in connection with a lathe type of device, specifically a copying or pattern lathe, and, briefly and broadly, various features, some of which may be omitted in usual practice, will now be set forth for ease of understanding of the functioning of the particular machine.

The illustrative machine includes the usual head stock and controls therefor and a tail stock whereby work pieces in the form of shafts or the like may be securely held by a chuck in the head stock and the tail stock center. Preferably, the work piece is fed by fluid-pressure actuated means driving the tail stock center so as to move the work piece into the chuck. The chuck is preferably arranged with spring means for ejecting the finished work piece when the tail stock center is withdrawn. The tail stock center is arranged for a normal feed movement to take care of work pieces of normal length, and safety mechanism is provided for shutting down the machine in case no work piece or an abnormally short work piece is positioned between the chuck and the center, whereby the feed slide will not contact the center or other parts and possibly injure any of the machine parts. Work pieces are normally carried in a magazine which is arranged preferably in rear of the tail stock, or at least rather distantly removed from the working zone between the chuck and the tail stock. The magazine may be agitated to align work pieces to pass into a chute, and cut-off arms are provided for feeding work pieces one at a time to a position to be picked up by the work feeding or transfer mechanism. The agitating of the magazine and the operation of the cut-off arms are preferably accomplished by common means, which is preferably fluid pressure actuated.

The work feeding or transfer mechanism preferably consists of a pick-off arm and a feed arm unitarily assembled and movable from a position adjacent the magazine, that is, well away from the zone of operations on the work piece, to the zone of machining operations. The work feeding or transfer mechanism is moved preferably in a direction about parallel to the axis of the chuck into the working zone, where the transfer mechanism is oscillated to pick up the finished work piece from the chuck and to deposit a new work piece, from the magazine, therein. The transfer mechanism is fed preferably by fluid pressure actuated means and the transfer mechanism is oscillated preferably also by fluid pressure actuated means. A safety latch, which may be fluid pressure actuated, is arranged for preventing oscillation of the transfer mechanism while the same is being translated from the zone of the magazine to the working zone, thus preventing any collision between the transfer mechanism and any other machine parts. Most of the motions in connection with the magazine feed means are accomplished through fluid pressure actuated means, and such fluid pressure actuated means are controlled electrically, as will be described or referred to during the subsequent description of the operation of the machine.

In the drawings which show, for illustrative purposes only, a preferred form of the invention—

FIG. 1 is a view in front elevation of a copying lathe, illustrating features of the invention;

FIG. 2 is an enlarged view of the right-hand end of the machine shown in FIG. 1, parts being shown in section;

FIG. 3 is a view in elevation of a detail at the extreme right of FIGS. 1 and 10 and viewed from the right end of FIG. 1;

FIG. 4 is an enlarged view in front elevation, parts being broken away and parts being shown in section, of the magazine and associated mechanism shown in elevation in FIG. 1;

FIG. 5 is an enlarged view in partial section, taken substantially in the plane of the line 5—5 of FIG. 4;

FIG. 6 is an enlarged fragmentary view of magazine feed parts and transfer mechanism, taken substantially in the plane of the line 6—6 of FIG. 4;

FIG. 7 is an enlarged fragmentary view of a detail shown in FIG. 6, cut-off arms being shown in one position;

FIG. 8 is the same view as FIG. 7, with the arms shown in a different position;

FIG. 9 is a development view of parts beneath the magazine and showing mechanism for agitating the floor of the magazine, as well as cam means for oscillating the cut-off arms shown in FIGS. 4 to 8, and taken in the plane of the line 9—9 of FIG. 4;

FIG. 10 is an enlarged horizontal view in section, taken substantially in the plane of the line 10—10 of FIG. 1, showing the stock feed and transfer mechanism and associated parts;

FIG. 11 is an enlarged, sectional view, taken substantially in the plane of the line 11—11 of FIG. 10 and illustrating the pick-off and feed arms in relation to the chuck and chuck center and illustrating the angles through which the stock feed mechanism illustrated oscillates during normal operation;

FIG. 12 is a sectional view on the double section line 12—12 of FIG. 10, and illustrates safety mechanism in connection with the transfer mechanism;

FIG. 13 is a fragmentary view in partial section of a detail shown in FIG. 4, and taken on line 13—13 of FIG. 4;

FIG. 14 is an enlarged fragmentary view of fluid pressure actuated means for the tail stock center and electrical speed means for controlling the same, and taken on line 14—14 of FIG. 15;

FIG. 15 is a sectional view taken substantially in the plane of the line 15—15 of FIG. 14;

FIG. 16 is a block circuit diagram; and

FIG. 17 is a perspective of a finished work piece.

The embodiment of one form of the invention, applied to one particular machine, will first be described in connection with that machine, and thereafter the general operation, including interlocks and safety features, will be set forth.

The invention is embodied in a copying or pattern lathe, which includes a main frame 5, a head stock 6, and a tail stock 7. The head stock includes the usual or desired mechanism for driving a chuck 8 for carrying a work piece 9 (FIGS. 10, 11). The chuck is preferably of a self-ejecting type, involving a spring or the like, for ejecting the finished work piece when the chuck is open and the tail stock withdrawn. A main tool slide 10 carries a tool, and the slide is fed preferably by fluid pressure means, so as to bring the tool up to the work, and is fed longitudinally or in a turning direction, preferably by mechanical means, as will be understood. A pattern 11 may be secured to a part of the frame, and a tracer or follower 12 engages the pattern, and the tool slide follows along the path determined by the pattern 11 to form a work piece, for example a shaft, as shown in FIG. 17. Such machines, in general, are now on the market and quite well known, and a full explanation of the operation and construction do not appear to be necessary in this particular application. The work pieces, such as shafts 9, are fed into the chuck, impelled by the tail stock center 13 (FIG. 10), as will be understood.

The invention relates particularly to magazine feed means for feeding work pieces to the chuck, and means for picking finished work pieces from the chuck. The magazine 14, in general, is shown in FIGS. 1 and 4 to 9, inclusive. The magazine 14 includes a hopper for work pieces, and a floor formed in two parts 15—15 is movable to agitate the work pieces and tend to align them before entry into a chute 16. In the form illustrated, the floor members 15 are pivoted at the upper ends, and eccentric bearings 17—17 act on the floor so that, upon rotation of the bearings, the floor will be rocked, for the purpose set forth. In the form illustrated, the eccentric bearings are rotated by means of pinions 18—18 and an idler 19. A rack 20 meshes with one of the pinions or gears, as illustrated particularly in FIGS. 5 and 9, so that as the rack moves up and down under the influence of a piston in cylinder D, the gears will be turned and the floor rocked. The work pieces, such as shafts, pass between the ends of the floor members 15—15 into the chute 16, where they pile up, particularly as shown in FIG. 6.

The chute 16 is opened or recessed near the lower end for receiving the ends of short cut-off arms 21 and long cut-off arms 22. These cut-off arms are mounted on concentric shafts pivoted to the magazine at 23, and the upper ends or extensions of two of the cut-off arms carry rollers or cam followers 24 for coaction with cams 25—26. These cams are mounted on a shaft 27, which carries a pinion 28, which in turn meshes with the rack 20, heretofore mentioned. Therefore, as the rack moves, the pinion 28 is turned so as to cause the cams 25—26 to pass under the rollers 24. In the form shown, spring means 29 (FIG. 6) between the arms and the chute 16 raise the cut-off arms 21—22 when permitted by the cams. When the long arm 22 is raised, a work piece held thereby drops down to the final position, as shown particularly in FIG. 6, to be later picked up by the spring fingers of the pick-up mechanism to be later described. When the short arms 21 are raised, a new work piece is dropped down in position to be held by the long arms, as will be understood. The cams 25, 26 are rotated by the shaft 27, pinion 28 and rack 20. The stroke of the rack 20 is such that one stroke rotates the shaft and cams 180°. As shown in FIGS. 4 and 6 both follower rolls will be on high cam dwells. A blank 9 has been dropped and will be picked up by the pick-up fingers 31. When the rack 20 reverses the cams 25, 26 will move clockwise (FIG. 6) and the follower of long arm 22 will leave the dwell and engage a cam surface to rock the long arm clockwise to drop a new work blank into position to be picked up by the fingers 31. Further rotation will cause the short arm 21 to rock clockwise and drop a work blank down into engagement with the long arm 22. Thereafter the cams will be reversed and the short arm will again descend and the long arm will rock to drop a new blank after the one last dropped has been picked up by the fingers 31—31. The timing of the cams is such that a new blank is dropped after the previously dropped one has been removed by the fingers 31—31.

As shown particularly in FIG. 6, the stock pick-up mechanism and transfer mechanism may consist of an arm or boss 30, having means such as spring fingers 31, which at the proper time rocks down and picks up the work piece from the location shown in FIG. 6. The loading and pick-up arm 30 at the opposite side has means, such as spring fingers 32, to pick a finished work piece from the chuck when the loading and pick-off mechanism is in position to engage the work piece in the chuck, all as will be described. The loading and pick-off means 30 may consist of separate arms or projections, as shown particularly in FIGS. 6 and 10, each of which is provided with the spring fingers 31—32, heretofore described. These loading or pick-off shock carrying members are mounted for oscillation, as well as translation, on a sleeve or quill 33, which in turn is splined to a pilot or guide shaft 34, which at the forward end may be mounted in a bearing 35 at the head stock end of the machine, so as to give steadiness and stability to the magazine feed mechanism. The shaft 34 rocks or oscillates and as it does so, as will be later described, so also will the splined sleeve 33 oscillate or rock. The sleeve 33 and shaft 34 are carried in an outer tube or sleeve 36 which moves longitudinally, but is keyed against oscillation as at 37 to the housing 38, which may form part of a cylinder A mounted on the frame of the machine (see also FIG. 12).

The sleeve 33 (FIGS. 10, 12), carrying the loading arm means 30—30, is translated by means of a piston in the cylinder A. This piston has a piston rod 40 secured to the outer movable sleeve 36. There is a finger or yoke 42, which fits in a spool 43 carried by the sleeve 33, so that as the piston rod 40 moves back and forth, the outer sleeve 36 and the sleeve 33, carrying the loading and feed arms 30—30, are translated or moved back and forth with the piston. Fluid pressure is fed to the cylinder A, as will be later described, so as to move the piston rod 40 back and forth to bring the loading arms 30—30 opposite the work pieces discharged by the magazine, so as to pick up a work piece and then, after oscillation, to move the work piece forward to the zone of the chuck so as to deposit the same in the chuck. The sleeve 33 and the arms 30—30 thereon are oscillated with the shaft 34 because of the splined connection between the shaft 34 and the sleeve 33. The shaft 34 at the right hand end (FIG. 10) carries a stop arm 34' and the machine frame has an abutment 34" (FIGS. 2 and 3) to be engaged by the stop arm 34' to limit the oscillation of the shaft 34 and pick up feed arm 30 to the pick up and feed positions.

The oscillating mechanism for the work carrying arms 30—30 is best shown in FIGS. 2 and 10. At the rear of the shaft 34 (as viewed in FIG. 10), there is a pinion 44, which meshes with a rack 45, acting vertically in the present instance. This rack is actuated by a piston rod 46, carried by a piston in the cylinder C, mounted near the base of the machine. Thus, as fluid pressure in the cylinder C actuates the rack 45, the pinion 44 is oscillated so as to oscillate the shaft 34, and with it the sleeve 33 and arms 30—30 carried thereby. Thus, the sleeve 33 and arms 30—30 carried thereby in the neutral or translating position, shown particularly in FIG. 6, may be translated by means of the piston rod 40, as has been described. However, before translation of the arms 30—30, they are positioned rearwardly, as shown for example in FIG. 1, and then through actuation of the rack 45, the pinion 44 is turned so as to cause spring fingers 31—31 to swing clockwise and resiliently grasp and pick up the work piece (FIG. 6). The rack is then actuated to again swing the arms 30—30 into the neutral or translating position shown in full lines in FIG. 6 and shown in FIG. 2. With the arms 30—30 thus positioned, the fluid pressure in the cylinder A will cause the arms to carry the work piece from the magazine forwardly into the zone of the work piece. However, before this translation takes place, a dog or latch 47 (FIG. 2) engages a notch in the rack 45, so as to definitely hold the rack in position during the translating movement of the arms 30—30 just described. This dog 47 is actuated by the piston rod of a piston in cylinder B, mounted at the rear of the frame. When the work piece from the magazine has been moved up to the zone of the chuck, the dog 47 is withdrawn so as to leave the arms 30—30 free to swing. At that time, then, the arms swing from the position shown in a counterclockwise direction, as viewed in FIGS. 6 and 11, and two spring fingers 32—32 on the pick-off arm engage a finished work piece held in the chuck (FIG. 10). Thereafter, the tail stock center 13 is withdrawn and the work piece is ejected from the chuck as by means of a spring in the chuck. Thus, the finished work piece (FIG. 10) is held by the pick-off means. Thereafter, the rack 45 at the rear of the machine is again moved, so as to oscillate the arms 30—30, so as to bring the latter back to the neutral position and then on forwardly or in a clockwise direction so as to deposit the new work piece held by the fingers 31—31 in line with the chuck, after which the stock stop center 13 may be brought up so as to force the work piece into the chuck, where it is gripped and will be centered by the stock stop center 13. Thereafter, the loading and pick-up mechanism 30—30 will be oscillated back to neutral or translating position, and the dog 47 (FIG. 2) will again engage in the notch in the rack 45 so as to hold the pick-off and loading arms in the position shown in FIGS. 2, 6 and 11. Thereafter, pressure fluid is admitted to the tail end of the cylinder A so as to withdraw the loading arms 30—30 to a position in front of the magazine and away from the working zone of the machine. Thereafter, the dog 47 (FIG. 2) is again withdrawn, and the rack 45 actuated by fluid pressure in the cylinder C to again rock the arms 30—30 in a clockwise direction to pick up a new work piece, which, in the meantime, has been fed down by the cut-off arms 21—22. During this oscillation to pick up a new work piece, the finished work piece carried by the spring fingers 32—32 will engage a knock-off abutment 48, which may be in the form of two knock-off arms fastened to the front of the magazine so that the finished work piece will be knocked out of the spring fingers 32—32 and will fall into the work discharge chute 49, as will be understood. It will be seen that during the full oscillation of the shaft 34 and the arms 30—30, an arm on the rear end of the shaft 34 will engage the adjustable limit abutments shown particularly in FIGS. 3, 2, 10, 1.

In the present machine, the tail stock center is fluid pressure actuated, and the frame carries a cylinder T (FIGS. 10, 14), having a piston rod engageable with the tail stock center 13 or a quill carrying the same, which projects and retracts the tail stock center for performing the usual functions. The piston in the cylinder T has a piston rod extension or tail, which is so arranged in connection with switches to be later referred to, so as to cut off the feed functions of the machine in case the stock stop feeds beyond a predetermined distance. Thus, if for any reason, stock should run out in the magazine, or in case an abnormally short work piece were put in place, there would be no danger of a very long feed-out of the tail stock center or its quill, with possible danger of damage by the tool slide 10 or other moving parts. Thus, the tail stock center is given a normal feed-out movement, but any movement in excess of that will cause a stoppage of the feed functions of the machine.

The actual functioning of the various parts may be best understood and will now be described in connection with the actual operation of the machine. As has been indicated, most of the parts are fluid pressure actuated and the various controls are electrical. The operation may be about as follows:

It will be convenient to assume that a work piece has just been finished. The tool slide retracts, contacts limit switch LS2 (FIG. 1), which deenergizes a relay, which in turn deenergizes the clutch; the brake is energized and the spindle stops. This action also energizes one of the solenoid valves BC (FIG. 1), which in turn puts air in cylinder A (FIGS. 1, 10) on the head end and moves the loading arms 30—30 forward towards the head stock. The piston in cylinder A then comes to the end of its stroke. The loading arm 30 or part movable therewith contacts a limit switch LS3 (FIGS. 1 and 10), which energizes one of the solenoid valves DE (FIG. 2), thus putting pressure in the cylinder B on the tail end, so that the piston therein will pull the dog or latch 47 out of the notch in the rack 45. This action will also contact limit switch LS4 (FIG. 2), which through a relay energizes solenoid valve HJ (FIGS. 1 and 4) to put pressure in cylinder D (FIGS. 1, 4 and 5) on the head end, causing cams 25—26 in the hopper to go through a 180° motion and thereby causing the cut-off arms 21—22 to drop a new work piece into the loading positoin (FIG. 6). This relay is to stay energized even though plunger 47 moves from limit switch LS4 (FIG. 2) through a later motion and the relay is not to be deenergized until loading arm 30 goes through the 54° rocking movement to pick up a new work piece (FIG. 6). This 54° movement is accomplished at the end of the cycle after the outer tube 36 has contacted limit switch LS10 (FIGS. 10 and 12), allowing the dog 50 to contact limit switch LS12 (FIGS. 1, 4 and 13), mounted on the side of the hopper. This limit switch LS12 is to deenergize a relay and energize solenoid valve HJ (FIGS. 1 and 4) to put pressure in cylinder D on the tail end, thus causing rack 20 to move up again. Also, this limit switch LS12 is to energize, through a time delay of one or two seconds, one of the solenoid valves DE (FIG. 2), putting pressure in cylinder B on the head end, and, through another time delay of one, two, or more seconds, to energize solenoid FG (FIG. 1), putting pressure in cylinder C (FIGS. 1 and 2) on head end to bring the loading arm 30 back again to neutral or translating position. There is also pressure on the head end of cylinder C because limit switch LS12 caused such at the end of the cycle.

When the pick-off and stock-feed mechanism is in the working zone (FIGS. 10, 11), that is, adjacent the chuck, the pick-off arm 30 is rocked counterclockwise 172° to grip work piece 9, held between the chuck and the tail stock center, and the rack 45, now in its completed upward position (plunger or latch 47 withdrawn), contacts a time switch LS5 (FIG. 2), which energizes solenoid valve KL (FIG. 1) to open the jaws of the chuck. Limit switch LS5 should now also energize solenoid valve MN (FIG. 5), putting pressure in cylinder T (FIGS. 10 and 14) on the left-hand side, as viewed in FIG. 14. When the tail stock retracts two inches, a dog 55 mounted on a piston rod extension should contact limit switch LS6 (FIGS. 10, 14, 15), which should energize solenoid FG (FIG. 1), putting pressure in cylinder C (FIG. 2) on the tail end, thus causing the rack 45 to move down and loading arm 30 to swivel or rock 273 (172° plus 101°—FIG. 11) and thereby bring a new work piece held in loading fingers 31 in line with the chuck and center and remove the finished work piece held in fingers 32. The rack 45 in its completed downward position contacts limit switch LS7 (FIG. 2), which energizes solenoid valve MN (FIG. 5), putting pressure in cylinder T (FIG. 14) on the right-hand side to advance the tail stock center and position the new work piece in the chuck. Limit switch LS7 (FIG. 2) should also, through a time delay of one or two seconds, energize solenoid valve KL (FIG. 1), causing the jaws to close. When the tail stock quill moves forward two inches to center the work, the dog on the piston rod extension should contact limit switch LS9 (FIG. 14), energizing solenoid valve DE (FIG. 2), putting pressure in cylinder B on the head end. Limit switch LS9 should also, through a time delay of one or two seconds (or by means of a back-pressure valve operating from the head end of cylinder B), energize solenoid FG (FIG. 1), putting pressure in cylinder C (FIGS. 1 and 2) on the head end of the cylinder. It should be noted that, having pressure on the head end of cylinder B and on the head end of cylinder C, keeps loading arm 30 in neutral or slidposition. With pressure on the head end of cylinder B and the dog 47 entered in the notch in the rack 45, limit switch LS11 is contacted, which is to energize solenoid valve BC (FIG. 1), putting pressure in cylinder A on the tail end. Loading arm 30 is thereby moved back to its position in front of the hopper. It should also be noted that, limit switch LS11, through a relay, is also designed to energize clutch, deenergize brake, and energize solenoid O at the bottom of the tool slide (FIG. 1) to start tool slide up and cutting.

When the loading arm 30 retracts to a position in front of the magazine hopper, the outer tube 36 contacts limit switch LS10 (FIGS. 10 and 12), and energizes solenoid valve DE (FIG. 2), putting pressure in cylinder B on the tail end, thus causing plunger or detent finger 47 to be pulled out of rack. During these actions, the spindle keeps on rotating and the tool side cutting, even though the plunger 47 moves off the limit switch LS11, due to the fact that LS11 previously energized a relay to start the cycle, and this relay is not deenergized until the tool slide moves down after completing the turning of the work (by limit switch LS2), as described heretofore. The limit switch LS10 also energizes solenoid FG (FIG. 1), putting pressure in the cylinder C on the tail end (FIG. 2) and causing the loading arm 30 to go through a 54° rocking movement to pick up a new work piece from the hopper chute 16 (FIG. 6). When this 54° movement takes place, the dog 50 (FIG. 13) on the loading arm contacts limit switch LS12, as heretofore described, all at the end of the cycle.

In the interest of safety and preventing collision between the tail stock center or quill and the tool slide, there is a third or safety limit switch in the tail stock extension (FIGS. 14, 15) placed about one-quarter of an inch from the switch LS9. This safety feature is provided so that, if the hopper should be allowed to be emptied, or an abnormally short piece of stock were put in the chuck, the tail stock quill would ordinarily be free to move a full four inches or more forward, and the tool slide might collide with the quill, with consequent damage to both parts. Therefore, this safety switch is connected to shut off the machine automatically. The dogs and switches in the tail stock piston rod extension are, of course, adjustable.

The machine may be operated manually in the usual fashion by throwing a switch, putting the machine on manual operation.

It will be seen that a machine has been provided, which may be entirely automatic in operation, and which will move finished work and insert new work, so that it may be finished and complete cycles gone through over and over again, always turning out duplicate work pieces in accordance with a particular pattern or sample desired. Various safety features and interlocks have been provided so as to avoid injury or accidental collision of machine parts and as safeguards to prevent injury to the machine or the operator. Some of the features described may be omitted.

Various other changes and modifications may be made within the scope of the invention as defined in the appended claims.

I claim:

1. In a machine of the character indicated, a work holder, means for removing a finished work piece from said work holder and feeding a new work piece to said work holder, including a pick-off arm and a work feeding arm in angularly fixed relation about an oscillation axis, fluid pressure actuated means for axially displacing said arms from a position removed from the zone of said work holder to the zone of said work holder, means for oscillating said arms about said axis, and interlock means operative during axial movement of said arms by said fluid pressure actuated means for assuring that said arms will be oscillated only when the latter are in the zone of said work holder and also when said arms are removed from said work holder.

2. In a device of the character indicated, a work holder, means for removing a finished piece of work from said work holder and inserting a new work piece therein and comprising a pick-off arm and a feeding arm unitarily associated with each other, keying means for holding said arms in definite rotative position, fluid pressure actuated means for sliding said arms toward said work holder, means for withdrawing said keying means to permit oscillation of said pick-off and feeding arms, and fluid pressure actuating means for oscillating said arms for picking a finished piece of work from said work holder and for inserting a new work piece in said work holder, means for again actuating said keying means to hold said arms against oscillation whereby the same may be withdrawn without interference with other machine parts, and means for again oscillating said arms to pick up a new work piece and to knock off a finished work piece from said pick-off arm, for the purpose set forth.

3. In a machine of the character indicated, a work holder, work feeding means for feeding a new work piece to the work holder and for withdrawing a finished piece therefrom, said work-feeding means comprising a work pick-off member and a work-feed member in fixed angularly spaced relation about an oscillation axis, means for moving said work feeding means to bring a new work piece to the work holder zone, means for oscillating said work feeding means, including a rotatable shaft for rocking said work feeding means to pick off a finished work piece from the work holder and deposit a new work piece therein, said last-defined means including a rack and pinion for oscillating said shaft, actuating means for displacing said rack to oscillate said work feeding means, a latch for locking said rack against movement, whereby said shaft may be held against oscillating movement and in definite angular position about said axis, during movement of said work feeding means by said moving means.

4. In a machine of the character indicated, a work holder, work feeding means for removing a work piece from the work holder and inserting a new work piece therein, said means being movable in a longitudinal direction to position said work feeding means in the zone of said work holder, said work-feeding means comprising a work pick-off member and a work-feed member in fixed angularly spaced relation about an oscillation axis, means for oscillating said work feeding means while in said zone of said work holder, said oscillating means including a shaft connected with said work feeding means, a pinion thereon, a rack for actuating said pinion, fluid pressure actuated means for actuating said rack to oscillate said work feeding means, a power-actuated latch for latching said rack in one definite position, whereby said work feeding means may be held against oscillation while being moved longitudinally into and away from the zone of said work holder.

5. In a machine of the character indicated, a chuck for holding a work piece to be turned, means for feeding work pieces to be picked up by a feed arm, work-transfer means rotatable about a translation axis offset from said chuck for removing a finished work piece from said chuck and for inserting a new work piece therein and comprising a pick-off arm and a feed arm unitarily assembled in fixed angular relation about said translation axis, means for holding said work-transfer means in a definite angular position with respect to said translation axis, means for moving said work-transfer means and a new work piece in said feed arm longitudinally of the axis of the chuck while said work-transfer means is held by said holding means in definite angular position, means for releasing said work-transfer means from said definite angular position, means for rocking the latter to pick a finished work piece from the chuck and to insert a new work piece in the chuck, and means for knocking out a finished work piece from said pick-off arm while said feed arm picks up a new work piece, for the purpose set forth.

6. In a machine of the character indicated, work dispensing means, work holding means, work transfer means including a work support mounted for angular and axial displacement on a translation axis, said work dispensing means and said work holding means being positioned at first and second locations, respectively, spaced apart along said translation axis, means for angularly displacing said work support relative to said translation axis to pick a rough work piece from said work dispensing means, and for removing a finished work piece from said work holder and for placing a rough work piece in alignment therewith, and means for axially displacing said work support to transfer work pieces between said first and second axially spaced apart locations.

7. In a machine of the character indicated, work-dispensing means and work-ejecting means at a first zone, work-holding means at a second zone, work-transfer means including a pair of parallel work supports mounted for angular and axial displacement on a translation axis extending generally between said zones, axial-displacement actuating means for axially displacing said work supports from said first zone to said second zone and for returning the same to said first zone, angular-displacement means for angularly displacing said transfer means at said first zone, whereby at said first zone a rough work piece may be picked up by one of said supports and a finished work piece in the other support may be ejected, and means for angularly displacing said transfer means at said second zone, whereby at said second zone said other support may pick up a finished work piece and said one support may transfer the rough work piece to said work-holding means.

References Cited in the file of this patent

UNITED STATES PATENTS

| | | |
|---|---|---|
| 583,426 | Bird et al. | May 25, 1897 |
| 1,512,430 | Loy | Oct. 21, 1924 |
| 1,541,118 | Cole | June 9, 1925 |
| 1,841,988 | Smith | Jan. 19, 1932 |
| 1,933,226 | Smith | Oct. 31, 1933 |
| 1,993,754 | Smith | Mar. 12, 1935 |
| 2,305,868 | Groene | Dec. 22, 1942 |
| 2,542,357 | Reed | Feb. 20, 1951 |
| 2,554,699 | Gamble | May 29, 1951 |
| 2,576,341 | Hanitz | Nov. 27, 1951 |
| 2,584,466 | Kaserman | Feb. 5, 1952 |
| 2,591,285 | Overly | Apr. 1, 1952 |
| 2,653,502 | Meyer | Sept. 29, 1953 |
| 2,690,691 | Ranney | Oct. 5, 1954 |
| 2,692,693 | Newburg | Oct. 26, 1954 |
| 2,713,283 | Lomazzo | July 19, 1955 |
| 2,714,324 | Dinsmore | Aug. 2, 1955 |
| 2,737,073 | De Haas | Mar. 6, 1956 |
| 2,739,717 | Dinsmore | Mar. 27, 1956 |
| 2,749,811 | Barker | June 12, 1956 |
| 2,802,586 | Wingard | Aug. 13, 1957 |